United States Patent [19]

Harris

[11] Patent Number: 5,068,255

[45] Date of Patent: * Nov. 26, 1991

[54] ION EXCHANGE RESINS PREPARED BY SEQUENTIAL MONOMER ADDITION

[75] Inventor: William I. Harris, Midland, Mich.

[73] Assignee: The Dow Chemical Company, Midland, Mich.

[*] Notice: The portion of the term of this patent subsequent to Jan. 14, 2003 has been disclaimed.

[21] Appl. No.: 44,543

[22] Filed: May 1, 1987

Related U.S. Application Data

[63] Continuation-in-part of Ser. No. 797,716, Nov. 13, 1985, abandoned, which is a continuation of Ser. No. 506,911, Jun. 22, 1983, Pat. No. 4,564,644, which is a continuation of Ser. No. 404,028, Aug. 2, 1982, abandoned.

[51] Int. Cl.$^5$ .............................. C08J 5/20; C08F 2/00
[52] U.S. Cl. ......................................... 521/28; 526/79; 526/87
[58] Field of Search ....................... 526/79, 87; 521/28, 521/38

[56] References Cited

U.S. PATENT DOCUMENTS

| | | | |
|---|---|---|---|
| 4,091,054 | 5/1978 | Saito et al. | 526/80 |
| 4,235,972 | 11/1980 | Jones | 521/38 |
| 4,271,281 | 6/1981 | Kelley et al. | 526/80 |
| 4,419,245 | 12/1983 | Barrett et al. | 521/28 |
| 4,564,644 | 1/1986 | Harris | 521/28 |

FOREIGN PATENT DOCUMENTS 1151480 5/1969 United Kingdom .

*Primary Examiner*—Thurman K. Page
*Assistant Examiner*—Peter F. Kulkosky

[57] ABSTRACT

A process for preparing copolymer beads suitable for conversion to ion exchange resins, comprising forming a polymeric matrix containing a plurality of free radicals, and continuously adding to said matrix, under conditions suitable for polymerizing a monomer feed which is imbibed by and polymerized within the matrices. Ion exchange resins prepared from beads made by such process exhibit improved osmotic and mechanical properties.

16 Claims, No Drawings

ION EXCHANGE RESINS PREPARED BY SEQUENTIAL MONOMER ADDITION

CROSS-REFERENCE TO RELATED APPLICATION

This application is a continuation-in-part of application Ser. No. 797,716, filed Nov. 13, 1985, and now abandoned, which is a continuation of application Ser. No. 506,911, filed June 22, 1983, now U.S. Pat. No. 4,564,644, which is a continuation of application Ser. No. 404,028, filed Aug. 2, 1982 and now abandoned.

BACKGROUND OF THE INVENTION

This invention relates to ion exchange resins and particularly to ion exchange resins in the form of spheroidal beads having high crush strength and high resistance to osmotic shock.

Polymeric ion exchange resins in the form of spheroidal beads are used in many applications as chelating resins and as anion or cation exchangers. In many of these applications, the resins are subjected to stresses which cause substantial breakage in the beads. Said stresses may be mechanical, i.e., due to crushing or collisions between beads or the beads and their containers, or osmotic, such as when the beads are subjected to sudden or repeated changes in electrolyte concentration. The breakage of the ion exchange beads causes substantial losses in the efficiency of the ion exchange column and large costs in replacing the broken resins.

Gel-type (microporous) resins have especially poor osmotic properties and their use in applications where they are subject to sudden or repeated changes in their environment is greatly limited. As a result, macroporous resins are generally employed when good osmotic properties are essential. However, said macroporous resins have very poor mechanical properties and substantially lower ion exchange capacity than gel-type resins.

In view of the deficiencies of known ion exchange resins, it would be desirable to provide a gel-type ion exchange resin having good osmotic and mechanical properties and high ion exchange capacity.

SUMMARY OF THE INVENTION

In one aspect, the present invention is crosslinked spheroidal gel-type copolymer beads having a core/shell morphology, wherein said beads, when fully functionalized to form an ion exchange resin, exhibit a crush strength of at least 700 g/bead and resistance to osmotic shock such that when the beads are contacted with 10 cycles of alternating 8 molar HCl and 8M NaOH, no more than 15 percent by number of the beads are broken.

In another aspect, this invention is a gel-type ion exchange resin comprising a crosslinked gel-type copolymer bead having a core/shell morphology, and having active ion exchange sites attached thereto, wherein said ion exchange resin exhibits a crush strength of at least 700 g/bead and wherein said resin exhibits a resistance to osmotic shock such that when said resin beads are subjected to 10 cycles of alternating 8 molar HCl and 8M NaOH, fewer than 15 percent by number of the beads are broken.

The ion exchange resins of this invention exhibit increased crush strengths and/or resistance to osmotic shock as compared to conventional gel-type ion exchange resins, while retaining the high ion exchange capacity of conventional gel-type ion exchange resins.

In another aspect, this invention is a process for preparing crosslinked copolymer beads comprising
(a) forming a suspension of a plurality of crosslinked free-radical containing polymeric matrices in a continuous phase, and
(b) contacting said free-radical containing matrices with a monomer feed comprising at least one ethylenically unsaturated monomer under conditions, including a temperature sufficient to initiate the free-radical polymerization of the monomers in the monomer feed, such that the monomer feed is imbibed by the free-radical containing matrices and the free radicals in the free-radical containing matrices catalyze the polymerization of the monomer feed within the free-radical containing matrices.

In another aspect, this invention is a process for preparing crosslinked copolymer beads comprising
(a) forming a suspension of a plurality of non-crosslinked free-radical containing matrices containing a catalytic amount of free-radical initiator in a continuous phase;
(b) subjecting the suspension of non-crosslinked free-radical containing matrices to polymerization conditions including a temperature sufficient to initiate the free-radical polymerization of free-radical containing matrices for a period of time sufficient to partially polymerize the monomers such that the matrices are sufficiently polymerized to form a gel, and
(c) contacting the partially polymerized free-radical containing matrices with a monomer feed containing essentially no free-radical initiator and comprising at least one ethylenically unsaturated monomer under conditions including a temperature sufficient to initiate the free-radical polymerization of the monomer in the monomer feed such that the monomer feed is imbibed by the partially polymerized free-radical containing matrices and the free radicals in the free-radical containing matrices catalyze the polymerization of the monomer feed within the free-radical containing matrices.

DETAILED DESCRIPTION OF THE INVENTION

The copolymer beads of this invention exhibit a core/shell morphology as defined hereinafter, and are characterized by having high crush strength and resistance to osmotic shock when converted to ion exchange resins. The copolymer beads of this invention can be functionalized to form strong acid, weak acid, strong base, weak base or chelating type ion exchange resins, all of which will exhibit improved mechanical properties. For the purposes of this invention, the term ion exchange resin includes chelating resins as well as anion and cation exchange resins. Representative anionic, cationic or chelating groups are described hereinafter. Said resins retain other desired characteristics of gel-type resins, i.e., high capacity and good ion selectivity.

The term "core/shell morphology" as employed herein, means that the polymeric structure of the copolymer beads of this invention changes from the inside to the outside of the bead. Said changes in polymeric structure may be somewhat gradual from the inside to the outside of the bead, yielding a bead having a gradient of polymeric structure along any radius thereof. Alternatively, said changes in polymeric structure may be relatively abrupt as one moves along a radius of the bead outward from the center, yielding a bead having a relatively distinct core having one polymeric structure and a relatively distinct shell having another polymeric structure. The rate of said changes in the polymeric structure of the bead is not particularly critical as long as the bead exhibits the aforementioned crush strength and resistance to osmotic shock. Accordingly, as used herein, the terms "core" and "shell" refer to the polymeric structure of the inside and the outside of the bead, respectively, and the use of said terms should not be construed as meaning that the beads of this invention will exhibit a distinct interface between the polymers of the inside and the outside of the bead.

While it is not intended to limit the invention to any theory, it is believed that the difference in polymeric structure in the core and the shell is due to (a) differences in primary molecular weight between the polymers in the core and the shell, it being believed that the shell polymers will have a higher average primary molecular weight than the core polymers, (b) differences in the amount of crosslinking in the core and shell polymers, (c) interpenetration of the polymers of the shell and the core, or (d) differences in the amount of strain on the polymers of the core and the shell or combinations of (a), (b), (c) or (d). It is believed that the excellent mechanical and osmotic properties of the copolymer beads of this invention are due, at least in part, to one or more of the foregoing differences in structure between the shell polymers and the core polymers. In addition to the foregoing, the shell may comprise a polymer of different monomers than the polymers of the core, or the core may have a different porosity than the shell.

It is understood that in describing "core polymers" and "shell polymers" there is usually, if not always, a significant amount of interpenetration of the polymers residing in the core and shell of the copolymer beads. Thus, the "core polymers" will extend somewhat into the shell of the bead, and vice versa. The terms "core polymers" and "shell polymers" and like terminology are employed herein to describe the polymeric material in the named portion of the bead in a general way without attempting to identify any particular polymers as "shell" or "core" polymers.

The aforementioned core/shell morphology of the copolymer beads of this invention is detectable using various known techniques for determining the structure of polymeric materials. In general, one or more of the following analytical techniques, among others, can be suitably employed to determine the core/shell morphology of the copolymer beads of the invention: dynamic thermal analysis, differential thermal analysis, osmium staining techniques, measurement of the respective refractive indices of the core and shell of the copolymer beads, conventional transmission electron microscopy, analytical transmission electron microscopy, scan transmission electron microscopy, and other suitable techniques. In addition, the beads of this invention often exhibit symmetrical strain patterns which are detectable by examination of the beads under polarized light. Often, the core/shell morphology of the copolymer beads of this invention is discernible simply from a visual inspection of the beads at no or low magnification, wherein the core is seen as an area of different color or as a darker or lighter area than the shell.

When functionalized to form an ion exchange resin, the core/shell morphology of these beads can often be seen by immersing a dry bead into water and determining the rate at which the bead becomes hydrated. Typically, the penetration of the shell portion of these beads by water is more rapid than the penetration of the core.

The beads of this invention preferably have a shell containing an average proportion of crosslinking monomers which is less than or equal to the average proportion of crosslinking monomers in the core. Due to the higher reactivity of divinylbenzene (DVB) compared to styrene, the core of the copolymer beads may be more highly crosslinked than the shell, even though the monomer feed being added to the free-radical matrix or seed particle has a higher percentage of crosslinking monomer than the core matrix. Beads of this type will have a shell which is softer or at least as soft (i.e., less friable and more elastic) than the core of the bead, thus allowing the bead to retain its shape and integrity, yet permitting the bead to distribute energy throughout its structure when subjected to external stresses and pressures. By distributing the energy throughout its structure, it is believed that the crush strength and resistance to osmotic shock of said heterogeneous beads is greatly enhanced.

Alternatively, or in addition, to the difference in the crosslink densities of the core and the shell, the polymers in the shell advantageously have a higher molecular weight than the polymers of the core. It is believed that said higher molecular weight of the shell polymers imparts mechanical strength to the bead and increases its resistance to osmotic shock.

The copolymer beads of this invention generally exhibit an effective crosslink density which is higher than the average proportion of the crosslinking monomers actually employed in the preparation of the core and the shell. The effective crosslink density is determined from the percent volume increase after swelling the beads with toluene by using a graph such as depicted on page 879 of the Kirk-Othmer *Encyclopedia of Chemical Technology,* 2nd Edition, published in 1966 by John Wiley and Sons, Vol. 11; R. M. Wheaton and A. H. Seamster, "Ion Exchange." In general, the beads of this invention will exhibit an effective crosslink density of about 1.5 to about 5 times that predicted from the average proportion of crosslinking monomers employed in the polymerization of the core and shell. While the cause of this high effective crosslink density is not precisely known and it is not intended to limit the invention to any theory, it is believed that this effect is due to (a) entanglement of the macromolecules of the shell with the polymers of the core, (b) stretching of polymer chains in the core due to the imbibation of monomers which are subsequently polymerized therein, (c) high molecular weight of the shell polymers due to the polymerization thereof at high conversion as described hereinafter, or (d) a combination thereof.

The copolymer beads of this invention exhibit excellent crush strength and, when converted to anion or cation exchange resins, exhibit excellent resistance to osmotic shock. The crush strength of the copolymer beads of this invention is excellent whether employed as an anion or cation exchange resin or as a chelating resin. However, the mechanical and osmotic properties of the resin vary somewhat according to the type and amount of active ion exchange groups contained thereon. Since the crush strength of a copolymer bead is generally lowest when fully aminated to form an anion exchange resin, the crush strengths of said fully aminated beads are used herein for the purposes of comparing the crush strengths of copolymer beads. By "fully aminated" is meant that at least 75, preferably at least 90, more preferably at least 95 percent of the repeating units in the bead to which amine groups can be attached bear amine groups. The degree of amination is often indicated from the ion exchange capacity of the aminated resin. Fully aminated gel-type ion exchange resins generally exhibit a dry weight capacity of at least 4.0 meq/g, usually at least 4.2 meq/g, although it is noted that capacity can also be influenced by other factors, such as the degree of crosslinking, the particular polymers present in the resin and the porosity of the resin.

"Crush strength," as that term is used herein, refers to the mechanical load required to break individual resin beads, given as a number average of about 30 testings. The crush strength of gel-type beads of this invention which have been fully aminated to form anion exchange resins is at least about 700 g/bead preferably at least 1,000 g/bead, more preferably at least 1,200 g/bead. By contrast, most previously known gel-type copolymer beads, when fully aminated to form anion ion exchange resins, exhibit crush strengths of less than 500 g/bead. When sulfonated to form strong acid-type cation exchange resins, the copolymer beads of this invention generally exhibit crush strengths of at least 1,200 g/bead and usually over 1,500 g/bead. Frequently, strong acid cation exchange beads of this invention will exhibit crush strengths of 2,000 g/bead or more. By contrast, most previously known strong acid, gel-type ion exchange resins exhibit crush strengths of less than 1,000 g/bead, usually less than 800 g/bead.

The functionalized beads (i.e., those to which active ion exchange sites have been attached) of this invention also exhibit excellent resistance to osmotic shock. Resistance to osmotic shock, for the purposes of this invention, is measured by subjecting a quantity of the functionalized beads to 10 cycles of alternate treatments with 8M HCl and 8M NaOH, wherein each treatment is separated by backwashings with deionized water. One full cycle of said treatment comprises (a) immersing a quantity of beads into 8M HCl for one minute, (b) washing with deionized water until the wash water is neutral, (c) immersing the beads in 8M NaOH for one minute and (d) washing the beads with deionized water until the wash water is neutral. All references to alternating treatments with 8M HCl and 8M NaOH contained herein refer to repeating cycles of this test. The resistance to osmotic shock of the beads is measured by the number of beads which remain unbroken after 10 cycles of the test. Typically, at least 85 percent of the functionalized beads of this invention will remain unbroken after 10 cycles of the osmotic shock test. Preferably, at least 90 percent, more preferably at least 95 percent, of the functionalized beads will remain unbroken after 10 cycles of the osmotic shock test.

Ion exchange resins comprising copolymer beads having a core/shell morphology as described hereinbefore to which active ion exchange sites are attached will generally exhibit crush strengths of at least 1,000 g/bead and less than 15 percent breakage when tested for resistance to osmotic shock as described hereinbefore. Preferably, said ion exchange resin has a crush strength of at least 1,200 g/bead and exhibits less than 10 percent breakage when subjected to the aforementioned osmotic shock test. Cation exchange resins comprising copolymer beads having the core/shell morphology as described hereinbefore which have been sulfonated will often have crush strengths of over 1,500 g/bead and exhibit less than 5 percent breakage on the aforementioned osmotic shock test.

In addition, the ion exchange resins comprising copolymer beads having a core/shell morphology as described hereinbefore, when fully aminated or sulfonated, will exhibit an ion exchange capacity comparable to those of conventional gel-type resins. It is noted, however, that ion exchange resins having somewhat lower ion exchange capacity can be prepared from the copolymer beads of this invention by intentionally underfunctionalizing the beads. However, the dry weight capacity of the anion exchange resins of this invention will generally be at least about 2.5, preferably at least 3.5, more preferably at least 4.0 meq/g. Cation exchange resins of this invention will generally exhibit a dry weight capacity of at least 2.5, preferably at least 4.5, more preferably at least 5.0 meq/g.

The copolymer beads of this invention can be prepared in any suitable size but advantageously have an average diameter in the range from about 50 to 7,000 microns, more preferably from about 200 to 2,000 microns. Said beads are of the so-called "gel" or "microporous" type. In addition, the core of the beads of this invention may contain polymeric material which is water-soluble when ion exchange sites are attached thereto, all or a portion of which material may be extracted to form pores or channels in the beads. The preparation of such gel and extractable seed beads is described more fully hereinafter.

The copolymer beads of this invention are advantageously prepared by forming a crosslinked free radical-containing matrix (hereinafter "free-radical matrix"), and contacting said free-radical matrix with a monomer feed comprising at least one monomer under conditions such that free radicals catalyze the polymerization of said monomer to form copolymer beads having a core/shell morphology. Said polymerization is carried out as a suspension polymerization wherein the polymeric matrix and the monomers to be polymerized are suspended in a suitable suspending medium which is generally an aqueous solution containing a suspension stabilizer.

The preparation of the free-radical matrix can be accomplished by any convenient procedure. Advantageously, said free-radical matrix is of the in situ, single stage or second stage types as described hereinbelow. Said "in situ" type free-radical matrix is advantageously formed by polymerizing in suspension a monomeric mixture containing mono- and polyethylenically unsaturated addition polymerizable monomers until the conversion of said monomers to polymers ranges from at least 10, preferably at least 20, up to the limiting conversion based on the reaction temperature and amount of crosslinking. Said "single stage" free-radical matrix is advantageously prepared by suspending a plurality of seed particles in a continuous phase and swelling said seed particles with a free-radical initiator. Said "second stage" free-radical matrix is advantageously prepared by suspending a plurality of seed particles in a continous phase, swelling said seed particles with an initial monomer charge comprising mono- and polyethylenically unsaturated monomers and a free-radical initiator and polymerizing the monomers within said seed particle until the conversion thereof to polymer is at least 20, preferably 40 to 95, more preferably about 40 to about 95 percent.

The "in situ" type free-radical matrix is advantageously prepared by the suspension polymerization of a monoethylenically unsaturated monomer and a polyethylenically unsaturated monomer to form a crosslinked matrix. The amount of polyethylenically unsaturated monomer employed is chosen such that the partially polymerized crosslinked free-radical matrix is sufficiently crosslinked to form a gel and render it insoluble in the monomer feed but less than an amount which renders the partially polymerized crosslinked matrix unable to imbibe the monomers of the monomer feed. Generally, said partially polymerized crosslinked matrix is prepared using from about 0.05 to about 20 weight percent of crosslinking monomer, more preferably from about 0.1 to about 12.5 and most preferably from about 1 to about 10 weight percent of crosslinking monomer. The polymerization is carried out using free radical initiators under conditions such that a plurality of partially polymerized gelled crosslinked polymer matrices are prepared. The polymerization is continued until the conversion of the monomers to polymer ranges from at least 10, preferably at least 20, up to the limiting conversion based on the reaction temperature and amount of crosslinking. According to this process, crosslinked polymer matrices are prepared containing therein a quantity of unreacted monomers and a plurality of free radicals.

In the preparation of the in situ free-radical containing matrix, it is advantageous to use a polymerization inhibitor such as p-benzoquinone or 2-nitro-4,6-dichlorophenol, with t-butyl catechol being most preferred in order to control the rate of reaction. The polymerization inhibitor may be employed in either the in situ monomer composition or the monomer feed composition or both. When used in the in situ monomer composition, the amount of inhibitor ranges from about 0 to about 200 ppm. When used in the monomer feed composition, the amount of inhibitor generally ranges from about 0 to about 250 ppm and preferably about 5 to about 150 ppm and most preferably about 10 to about 100 ppm.

In the preparation of the "single stage" free radical matrix, a suspension is formed comprising polymeric seed particles in a continuous phase. Said seed particles advantageously comprise a crosslinked addition polymer but may be a crosslinked condensation polymer such as phenol/formaldehyde polymer. Said seed particles are crosslinked in an amount which renders them insoluble in the type and amount of monomers employed in later stages of the process but less than an amount which renders them unable to imbibe free radical initiators and monomers. In general, said seed particles are prepared using from about 0.05 to about 12.5, preferably from about 0.2 to 2.0, weight percent of a crosslinking monomer. Into the suspension containing the crosslinked seed particles is added a free-radical initiator which is essentially insoluble in the continuous phase and which is imbibed by the seed particle. When the free-radical matrix is formed in this manner, the seed particle which has imbibed said free-radical initiator comprises the free-radical matrix as that term is employed in this invention.

Alternately and preferably, a second stage free-radical matrix is employed which is advantageously prepared by suspending a plurality of polymeric seed particles in an appropriate suspending medium, imbibing into said particles a free-radical containing initial monomer charge and polymerizing the monomers in the initial monomer charge until the conversion thereof into polymer is at least about 20 to about 95 percent, preferably at least 40 percent. This second stage free radical matrix will then comprise two polymeric networks. In this process, the seed is advantageously an addition polymer but may be a condensation polymer such as a phenol/formaldehyde polymer. Said seed polymer may be crosslinked or noncrosslinked, provided that said seed particle is insoluble in the type and amount of monomers employed in the initial monomer charge. Within the aforementioned broad limits, the amount of crosslinking in the seed particle is chosen such that the seed can imbibe the desired amount of monomers in the initial monomer charge. In general, increased amounts of crosslinking will decrease the amount of the initial monomer charge which can be imbibed by the seed particles. Advantageously, the seed particles are prepared using less than about 10 weight percent of a crosslinking monomer, preferably from about 0.1 to about 1.0 weight percent of a crosslinking monomer.

The initial monomer charge employed in the preparation of the second stage free-radical matrix contains both mono- and polyethylenically unsaturated monomers which, when polymerized, form a crosslinked polymer. The amount of crosslinking monomer employed herein is generally sufficient to render the beads, when functionalized, insoluble in water and to impart physical integrity and mechanical strength to the beads. In general, the initial monomer charge will comprise from about 0.5 to about 25, preferably from about 1 to about 12, weight percent of a crosslinking monomer. In addition, said initial monomer charge will advantageously comprise from about 0.005 to about 2 weight percent of a free-radical initiator.

To reduce the formation amount of offsize particles or "fines," the relative proportions of seed particles and initial monomer charge are chosen such that at least 75 weight percent, preferably essentially all of the initial monomer charge is imbibed into the seed particles. Said proportions will, of course, vary with the size of the seed particle and the degree of crosslinking in the seed particle. For example, a seed particle of relatively small size will generally imbibe proportionately less monomer than larger particles of similar crosslink density. Similarly, high crosslink density in the seed particle limits the particles' ability to imbibe monomers. In general, the seed particles will generally imbibe from about 0.5 to about 19, preferably from about 1.5 to about 9, times their weight of the initial monomer charge. The free-radical matrix advantageously comprises from about 5 to about 90, preferably from about 10 to about 70, more preferably from about 25 to about 50, weight percent of the weight of the product copolymer bead.

The prepared free-radical matrix is suspended in an appropriate suspending medium. When in situ single stage or second stage free-radical matrices are employed, preparation of said matrices and the subsequent addition and polymerization of the monomer feed are advantageously, and preferably, carried out in a single reaction vessel. In general, said suspending medium is a liquid in which both the free-radical matrix and the monomers to be contacted therewith are insoluble. Said suspending medium is typically an aqueous solution containing from about 0.1 to about 1.5 weight percent of a suspension stabilizer, but for the polymerization of water-soluble monomers, may be an organic compound. Suitable suspension stabilizers include gelatin, polyvinyl alcohol, sodium polymethacrylate, carboxymethyl methylcellulose, as well as surfactants such as sodium lauryl sulfate, sulfonated polystyrenes and the like. In addition, the suspension may suitably contain polymerization inhibitors, dispersants, and other materials known to be advantageously employed in the suspension polymerization of ethylenically unsaturated monomers.

The suspension is then contacted with a monomer feed comprising at least one ethylenically unsaturated monomer under conditions such that the free radicals contained in the free-radical matrix catalyze the polymerization of said monomer feed. Copolymer beads prepared according to this process usually exhibit a core/shell morphology. Generally, the free-radical matrix will reside mainly in the core of the polymer beads prepared by this process, while the polymers formed from the monomer feed will generally reside in the shell of the copolymer bead. However, it is believed that interpenetration occurs between the polymers of the free-radical matrix and those derived from the monomer feed. Accordingly, the interface between the core and shell may be gradual rather than sharp.

Advantageously, the suspension is heated to a temperature sufficient to initiate the free-radical polymerization of ethylenically unsaturated monomers. To the heated suspension is then added a monomer feed under conditions such that essentially all polymerization of said monomers is initiated by the free radicals contained in the polymer matrix. Preferably, the ratio of the weight of polymer to the combined weight of polymer and monomer present at any time during the addition of the monomer feed (instantaneous conversion) is at least about 20, more preferably at least 50 percent.

Instantaneous conversion may be measured in various ways, with the particular means of monitoring the reaction left to the practitioner as a matter of choice. The reaction may be monitored chemically, such as by taking periodic infrared spectra of the reaction mixture as the reaction proceeds to monitor the conversion of the carbon-carbon double bonds of the monomer to polymer. The difference in density between the unreacted monomers and the polymers can also form a basis for monitoring the mixture. For example, a reaction mixture containing about 1.35 g of styrene monomer per gram of water will have a density of about 0.936 g per cubic centimeter before polymerization and about 1.04 g after polymerization (at about 96 percent conversion). Said differences in density can be monitored using gravimetric techniques or preferably by the use of a nuclear densitometer such as an SG series density gauge sold by Texas Nuclear. More simply, the instantaneous conversion can be readily calculated from the heat of polymerization.

The instantaneous conversion is advantageously controlled by adjusting the rate at which the monomer feed is added to the suspension. Said monomer feed may be added continuously or intermittently to the suspension at constant or various rates during the course of the polymerization. Advantageously, the rate of addition of the monomer feed is such that the instantaneous conversion is at least 20, preferably at least 50 percent at all times during the polymerization reaction. It is believed that by maintaining the instantaneous conversion at higher levels, the monomers in the monomer feed will polymerize to form higher molecular weight polymers which are highly entangled about the polymers of the free-radical matrix. It is believed that the primary molecular weight of the polymers formed from the monomer feed according to this semi-continuous process are higher then that of polymers prepared according to conventional suspension polymerization processes by as much as a factor of 10 or more.

The monomer feed may contain a proportion of a polyethylenically unsaturated monomer or may consist entirely of monoethylenically unsaturated monomers. It is noted here that the monomers in the monomer feed may vary with time, in the proportion of crosslinking monomer contained therein or in the type of monomers employed or both. Advantageously, the monomer feed will, on the average, contain a proportion of crosslinking monomers no greater than the average proportion of crosslinking monomer in the polymeric matrix. More advantageously, a lower proportion of the crosslinking monomer is employed in the monomer feed, yielding a heterogeneous copolymer bead having a higher proportion of crosslinking in the core and a lower proportion of crosslinking in the shell.

In order to ensure that the polymerization of the monomers in the monomer feed is essentially completely catalyzed by the free radicals contained in the polymeric matrix, the monomer feed advantageously contains essentially no initiators. In addition, the continuous phase is also essentially free of initiators. One or more free-radical inhibitors which are soluble in the continuous phase are advantageously employed to inhibit the formation of free radicals in said continuous phase. Accordingly, while it is not intended that this invention be bound by any theory, it is believed that the generation of free radicals will occur almost exclusively within the free-radical polymer matrix. Therefore, it is believed that this formation of free radicals inside the free-radical matrix will tend to cause the monomers of the monomer feed to form high molecular weight chains which are highly entangled about the polymeric structure of the free-radical matrix.

After all the monomer feed is added to the reaction mixture, the reaction mixture is maintained at the polymerization temperature until the polymerization reaction is essentially complete. Advantageously, the polymerization temperature is increased about 20°–30° C. during the final stages of the polymerization reaction to "finish off" the reaction. The resulting polymer beads are recovered via conventional means such as filtration and advantageously dewatered and dried.

The monomers employed in the preparation of the free-radical matrix (i.e., those employed in the formation of the seed particle and initial monomer charge, if any) and the monomer feed are advantageously suspension polymerizable ethylenically unsaturated monomers. Such suspension polymerizable monomers are well known in the art and reference is made to *Polymer Processes*, edited by Calvin E. Schildknecht, published in 1956 by Interscience Publishers, Inc., New York, Chapter III, "Polymerization in Suspension" by E. Trommsdoff and C. E. Schildknecht, pp. 69–109 for purposes of illustration. In Table II on pp. 78–81 of Schildknecht are listed diverse kinds of monomers which can be employed in the practice of this invention. Of such suspension polymerizable monomers, of particular interest herein are the water-insoluble monomers including the monovinylidene aromatic such as styrene, vinyl napthalene, alkyl substituted styrenes (particularly monoalkyl substituted styrenes such as vinyltoluene and ethyl vinylbenzene) and halo-substituted styrenes such as bromo- or chlorostyrene, the polyvinylidene aromatic such as divinylbenzene, divinyltoluene, divinyl xylene, divinyl naphthalene, trivinylbenzene, divinyl diphenyl ether, divinyl diphenyl sulfone and the like;

esters of α,β-ethylenically unsaturated carboxylic acids, particularly acrylic or methacrylic acid, such as methyl methacrylate, ethyl acrylate, diverse alkylene diacrylates and alkylene dimethacrylates, and mixtures of one or more of said monomers. Of said monomers, the monovinylidene aromatics, particularly styrene or a mixture of styrene with a monoalkyl substituted styrene; the polyvinylidene aromatics, particularly divinylbenzene; esters of α,β-ethylenically unsaturated carboxylic acids, particularly methyl methacrylate or mixtures containing methyl methacrylate, particularly a mixture of styrene and divinylbenzene or styrene, divinylbenzene and methyl methacrylate are preferably employed herein.

Also included within the polymerizable monomers useful herein are those monomers which form a solution with a liquid, generally water, wherein the resulting solution is sufficiently insoluble in one or more other liquids, generally a water-immiscible oil or the like, such that the monomer solution forms droplets upon its dispersion in said other liquid. Representative of such monomers are water-soluble monomers which can be polymerized using conventional water-in-oil suspension (i.e., inverse suspension) polymerization techniques such as described by U.S. Pat. No. 2,982,749 which is hereby incorporated by reference, including ethylenically unsaturated carboxamides such as acrylamide, methacrylamide; aminoalkyl esters of unsaturated carboxylic acids and anhydrides; ethylenically unsaturated carboxylic acids, e.g., acrylic or methacrylic acid, and the like. Preferred of such monomers for use herein are the ethylenically unsaturated carboxamides, particularly acrylamide, and the ethylenically unsaturated carboxylic acids, particularly acrylic or methacrylic acid.

In addition to the aforementioned ethylenically unsaturated monomers, the seed particles employed in the preparation of the single stage and second stage free-radical matrices can also comprise a crosslinked condensation polymer such as phenol/formaldehyde resin. In general, said condensation polymers must be able to imbibe the free-radical initiators and the monomers of the initial monomer charge, if any, and the monomer feed.

The monomer feed may contain different monomers than those used to prepare the free-radical matrix. For example, the monomer feed may comprise styrene, divinylbenzene and methyl methacrylate and the free-radical matrix may comprise primarily styrene/divinylbenzene polymers. When the free-radical matrix is prepared by imbibing a catalyst containing initial monomer charge into a seed particle, the seed particle may contain different monomers than the initial monomer charge. Similarly, the composition of the polymers of the polymeric shell may be varied from the inside to the outside of the shell by changing the composition of the monomer feed during the course of the polymerization thereof. Because the polymers contained in the polymer beads of this invention can be widely varied, the beads of this invention can be readily tailored for specific end-uses.

Beads having an extractable seed are advantageously prepared using a lightly crosslinked or noncrosslinked seed particle which is insoluble in the amount and type of monomers used in the preparation of the polymeric matrix and the initial monomer charge, but when active ion exchange sites are attached thereto, become water-soluble and are extractable from the bead when immersed in water. Beads prepared having such extractable seeds will contain small voids when all or a portion of the seed is removed therefrom.

Copolymer beads having relatively uniform size are prepared according to the process of this invention by using uniform size seed particles. Uniform size seed particles are prepared by screening the seed particles or by preparing the seed particles using a process which produces polymer particles of uniform size, such as those taught in published European Patent Application Nos. 0005619 and 0051210 which are hereby incorporated by reference in their entirety. Advantageously, at least 80 percent of the seed particles employed to prepare the copolymer beads of this invention are greater than 0.5 and no more than 1.5 times the weight average particle size of the seed particles.

The size of the copolymer beads of this invention is advantageously in the range from about 50 to 2,000 microns ($\mu$m), preferably from about 200 to 1,200 $\mu$m. Control of the size of the beads is achieved primarily by controlling the size and crosslinking in the seed particles employed, if any, and the amount of monomers employed in the monomer feed. The seed particles can range in size from very small particles, i.e. about 10 $\mu$m, to larger particles having a diameter of 750 $\mu$m or more. Preferably the size of the seed particle is in the range from about 100 to about 750 $\mu$m in diameter.

The polymer beads are converted to anion or cation exchange beads using techniques well-known in the art for converting crosslinked addition polymers of a mono- and polyethylenically unsaturated monomer to such resins. In the preparation of weak base and chelating resins from poly(vinylaromatic) copolymer beads such as crosslinked polystyrene beads, the beads are advantageously haloalkylated, preferably halomethylated, most preferably chloromethylated, and the ion active exchange groups subsequently attached to the haloalkylated copolymer. Methods for haloalkylating the crosslinked addition copolymers and the haloalkylating agents included in such methods are also well known in the art. Reference is made thereto for the purposes of this invention. Illustrative of such are U.S. Pat. No. 2,642,417; 2,960,480; 2,597,492; 2,597,493; 3,311,602 and 2,616,817 and *Ion Exchange* by F. Heifferich, published in 1962 by McGraw-Hill Book Company, N.Y., all of which are hereby incorporated by reference. Typically, the haloalkylation reaction consists of swelling the crosslinked addition copolymer with a haloalkylating agent, preferably bromomethyl methylether, chloromethylmethyl ether or a mixture of formaldehyde and hydrochloric acid, most preferably chloromethylmethyl ether and then reacting the copolymer and haloalkylating agent in the presence of a Friedel-Craft catalyst such as zinc chloride, iron chloride and aluminum chloride.

Generally, ion exchange beads are prepared from the haloalkylated bead by contacting said bead with a compound reactive with the halogen of the haloalkyl group and which, upon reaction, forms an active ion exchange group. Such compounds and methods for preparing ion exchange resins therefrom, i.e., weak base resins and strong base resins, are well known in the art and U.S. Pat. Nos. 2,632,000; 2,616,877; 2,642,417; 2,632,001; 2,992,544 (all of which are hereby incorporated by reference) and F. Helfferich, supra, are illustrative thereof. Typically, a weak base resin is prepared by contacting the haloalkylated copolymer with ammonia, a primary amine or a secondary amine. Representative primary and secondary amines include the methyl amine, ethyl amine, butyl amine, cyclohexyl amine, dimethyl amine, diethyl amine and the like. Strong base ion exchange resins are prepared using tertiary amines such as trimethyl amine, triethyl amine, tributyl amine, dimethylisopropanol amine, ethylmethylpropyl amine or the like as aminating agents.

Amination generally comprises heating with reflux a mixture of the haloalkylated copolymer beads and at least a stoichiometric amount of the aminating agent, i.e., ammonia or the amine, to a temperature sufficient to react the aminating agent with the halogen atom attached to the carbon atom $\alpha$ to the aromatic nucleus of the polymer. A swelling agent such as water, ethanol, methanol, methylene chloride, ethylene dichloride, dimethoxymethylene or combinations thereof is optionally, but advantageously employed. Conventionally, amination is carried out at conditions such that anion exchange sites are uniformly dispersed throughout the entire bead. Such complete amination is generally obtained within about 2 to about 24 hours at reaction temperatures between 25° and about 150° C.

Methods for converting copolymer beads other than poly(vinylaromatic) beads to anion exchange resins are illustrated in Helfferich, supra, pp. 48-58. In addition, methods for attaching other types of anion exchange groups, such as phosphonium groups, to copolymer beads are described therein.

Generally, chelate resin beads are prepared from the haloalkylated polymer by attaching thereto the chelate active groups, e.g. carboxyl groups. Illustrative of the well-known methods for preparing chelate resins is U.S. Pat. No. 2,888,441 wherein the haloalkylated polymer is aminated by techniques hereinbefore described and the aminated copolymer subsequently reacted with a suitable carboxyl containing compound such as chloroacetic acid. Alternatively, the haloalkylated polymer can be directly reacted with (1) a suitable amino acid, such as diamino acetic acid or glycine, or (2) an amino pyridine such as 2-picolylamine and N-methyl-2-picolylamine to form a chelate resin.

Cation exchange resin beads can be prepared using techniques well known in the art for converting the crosslinked addition copolymer of mono- and polyethylenically unsaturated monomers to a cation exchange resin. Illustrative of such methods of preparing cation exchange resin are U.S. Pat. Nos. 3,266,007; 2,500,149; 2,631,127; 2,664,801; 2,764,564 (all of which are hereby incorporated by reference) and F. Helfferich, supra. In general, the cation exchange resins useful herein are strong acid resins which are prepared by sulfonating the copolymer beads. While the sulfonation may be conducted neat, generally, the bead is swollen using a suitable swelling agent and the swollen bead reacted with the sulfonating agent such as sulfuric or chlorosulfonic acid or sulfur trioxide. Preferably, an excess amount of the sulfonating agent, for example, from about 2 to about 7 times the weight of the copolymer bead, is employed. The sulfonation is conducted at a temperature from about 0° to about 150° C.

Because of the improved strength of the resins of this invention, they can be employed under harsher conditions than previous gel-type resins. For example, the gel-type ion exchange resins of this invention can be advantageously employed in condensate polishing operations which now employ macroporous resins, or in mining operations, wherein high capacity resins with good mechanical and osmotic properties are needed, as well as in other uses for which conventional ion exchange resins are now employed.

The following examples are intended to illustrate the invention and are not intended to limit the scope thereof in any way. All parts and percentages are by weight based on the weight of the organic and water phases unless otherwise noted.

EXAMPLE 1

Into a 3-liter, stainless steel reactor equipped with an agitator are loaded 35 parts by weight of 0.3 percent crosslinked styrene/divinylbenzene copolymer seed having a particle size of 150-300 $\mu$m and sufficient water to suspend the seed particles. Further added, with agitation, is an initial monomer charge comprising 1.9 parts divinylbenzene (DVB), 63 parts styrene, 0.036 part t-butylperoctoate (TBPO) (based on the total weight of all monomers employed), 0.025 part t-butylperobenzoate (TBPB) (based on the total weight of all monomers employed), 0.15 part carboxymethyl methylcellulose (CMMC) and 0.15 part sodium dichromate. Water is then added in an amount such that the weight phase ratio is 1.0 after the addition of the monomer feed. The reaction mixture is then heated to 70° C. and maintained at 70° C. for 3 hours, at which time a monomer feed of 98.5 percent of styrene and 1.5 percent of DVB is begun. The monomer feed is fed at a constant rate into the reactor over a 10-hour period until said monomer feed comprises 71.4 percent by weight of the combined weight of the initial charge and the monomer feed. The reaction mixture is heated at 90° C. for an additional 1.5 hours and then raised to 100° C. for approximately 1.5 hours.

A portion of the copolymer beads thus obtained is dried and a 20-ml portion is measured into a column. The beads are then immersed in toluene and the change in volume of the beads is measured. From the change in volume, the effective crosslink density is determined using a graph such as depicted on page 879 of the "Kirk-Othmer *Encyclopedia of Chemical Technology*," 2nd. Ed., published in 1966 by John Wiley and Sons, Vol. II, R. M. Wheaton and A. H. Seamster, "Ion Exchange." The effective crosslink density (toluene swell crosslink percent) is shown in Table I following.

A 100-g portion of the copolymer beads are chloromethylated by reacting the beads with an excess of chloromethylmethyl ether in the presence of ferric chloride. The chloromethylated beads are then reacted with trimethylamine to form a strong base anion exchange resin bearing a plurality of quaternary ammonium ions. The anion exchange resin is then tested for percent original spheres, crush strength, resin size, osmotic shock resistance, dry weight capacity, and water retention capacity. The results are as given in Table I following.

The crush strength of the anion exchange resin of this and the following examples is determined by testing about 30 beads using a Chatillon Scale, Model DPP-1KG. The force, in grams, required to fracture each individual bead is recorded, with the crush strength reported as the average of about 30 such testings.

The number percent of the resin beads having flawless spheres (percent original spheres) is evaluated placing a small amount of the resin in a petri dish. A microscope having a camera mounted thereon is adjusted until about 200 resin beads fall within the vision field of the camera. A photograph is then taken. From the photograph, the total number of beads are counted, the total number of broken or cracked are counted, and the number percent of spherical beads calculated.

The size of the resin beads, when swollen with water, is determined by screen analysis.

The resistance to osmotic shock of the resin beads is tested using the procedure described hereinbefore wherein the beads are contacted with 10 cycles of alternating 8M HCl and 8M NaOH, with the results reported as the number percent of beads which remain unbroken after 10 cycles of the test.

The dry weight capacity of the resin is determined by drying a sample of the resin in the chloride form under an infrared lamp on a moisture balance until a constant weight is obtained. The dried resin is then cooled to room temperature in a closed vessel. About 0.5 gram of the dried resin is weighed into a suitable flask. The resin is then heated to 70°–80° C. with 100 ml of distilled water, 4 ml of sulfuric acid and 5 g $Na_2SO_4$ for 5 minutes. The mixture is cooled and titrated with 0.1 N $AgNO_3$ to an endpoint as indicated using a chloride sensitive electrode. The dry weight capacity is then reported as meq/g of resin.

EXAMPLE 2

The procedure of Example 1 is again repeated with 285 micron seed particles and 0.3 part CMMC. After the reactor is loaded with the seed particles and initial monomer charge, the suspension is heated to 80° C. for 2.5 hours. The monomer is 100 percent styrene, fed over a 6 hour period commencing 2.5 hours after the resin mixture reaches 80° C. The reaction mixture is heated for 3 additional hours at 80° C. after all the monomer feed is added, and then finished off at 100° C. for 2 hours. The beads thus prepared are chloromethylated and aminated in the manner described in Example 1 and the properties of the aminated beads are as reported in Table I following.

EXAMPLE 3

The procedure of Example 1 is again repeated, using a 0.3 weight percent crosslinked seed having an average particle size of 206 μm. The sodium dichromate used in this example is increased to 0.3 part. The reaction mixture is heated to 80° C. for 3.5 hours, at which time the monomer feed comprising 98.5 percent styrene and 1.5 percent DVB are added over a 6 hour period. Following the addition of the monomer feed, the reaction mixture is held at 80° C. for 3 more hours and then finished off at 100° C. for 2 hours. The beads thus obtained are chloromethylated and aminated as in Example 1 and the properties thereof are as described in Table I following.

EXAMPLE 4

The procedure of Example 3 is repeated, this time using 35 parts of 0.3 percent crosslinked seed particle with a particle size between 250 and 300 μm, 6.5 parts DVB and 58.4 parts styrene in the initial charge to the reaction vessel. The monomer feed is begun 2.5 hours after the reaction mixture reaches 80° C., and comprises 3.5 percent DVB and 96.5 percent styrene. The beads are chloromethylated and aminated as described in the previous examples, with the properties thereof as described in Table I following.

EXAMPLE 5

The general procedure of Example 3 is repeated, this time using 35 parts of 0.3 percent crosslinked seed particles having diameters between 350 and 500 μm; 1.5 parts DVB and 63.4 parts styrene. The reaction mixture is heated to 80° C. for 3 hours and a monomer feed comprising 99 percent styrene and 1 percent DVB is added over a 6 hour period. The reaction is then heated at 80° C. for an additional 3 hours and finished off at 100° C. for 2 hours. The beads thus obtained are chloromethylated and aminated as described in the previous examples, with the properties thereof as described in Table I following.

EXAMPLE 6

The procedure of Example 3 is again repeated, using 40 parts of 0.25 percent crosslinked seed particles with diameters between 150 and 212 μm, 4.2 percent DVB and 55.7 percent styrene. The monomer feed comprises 2.5 percent DVB and 97.5 percent styrene, and is begun 2.5 hours after the initial charge to the reaction vessel is heated to 80° C. The monomer feed is added over a 6 hour period, after which the reaction vessel is maintained at 80° C. for 4 hours and finished off at 110° C. for 2 hours. The beads thus obtained are chloromethylated and aminated as described in Example 1 and the properties of the anion exchange resin thus obtained are as described in Table I following.

TABLE I

| Example No. | Ave. DVB %[1] | Toluene Swell[2] Crosslink % | Crush Strength,[3] grams | % Orig.[4] Spheres | Resin Size, μ | % Spheres[5] 10 Cycles Osmotic Shock Test | Dry[6] Weight Capacity (meg/g) | Water[7] Retention Capacity % |
|---|---|---|---|---|---|---|---|---|
| 1 | 1.64 | 4.0 | 1470 | 98 | 600–1000 | 80 | 4.28 | 57.2 |
| 2 | 0.57 | 4.5 | 1220 | 100 | 850 | 88 | 4.44 | 54.7 |
| 3 | 1.64 | 4.25 | 1700 | 98 | 600–850 | 95 | 4.40 | 55.4 |
| 4 | 4.39 | 6.65 | 1300 | 98 | 800 | 97 | 4.13 | 42.2 |
| 5 | 1.16 | 3.0 | 3900* | 99 | 1700 | 55 | 4.41 | 56.6 |
| 6 | 3.0 | 6.85 | 1400 | 96 | 500–710 | 95 | 4.07 | 46.4 |

[1]The weight of percent DVB employed in preparing the copolymer bead based on the total weight of all monomer employed and the seed particle. The weight percent of DVB employed in the seed particle, the initial monomer charge and the monomer feed are given in each particular example.
[2]The effective crosslink density as determined by swelling the copolymer bead in toluene prior to the functionalization thereof and measuring the increase in volume of said beads.
[3]The average force required to fracture the functionalized bead given as an average of about 30 testing. A small crush head is used for these testings, except that a large crush head is used for those values marked with an asterisk.
[4]The number percent of functionalized beads which are flawless, i.e., are not broken or cracked.
[5]The number percent of functionalized beads which withstand 10 cycles of alternating treatments with 8 M HCl and 8 M NaOH without breaking.
[6]Dry weight capacity expressed as meg/g, determined according to the procedure described in Example 1.
[7]Water retention capacity expressed as weight percent water based on total weight of the functionalized resin and the water imbibed therein.

As can be seen from Table I, the copolymer beads of this invention exhibited a higher effective crosslink density as measured by toluene swell then actual crosslink density. The aminated resin beads of this invention exhibit excellent crush strength and little breakage upon being subjected to 10 cycles of alternating 8M hydrochloric acid and 8M hydroxide. In addition, the dry weight capacity these resins is generally high, indicating that the beads are fully aminated.

EXAMPLE 7

Into a 1-gallon, stainless steel reactor equipped with an agitator are loaded 35 parts by weight of 0.3 percent crosslinked styrene DVB copolymer seed particles having a particle size of about 285 microns. To the seed particles are added, with agitation, 65 parts water, 3.25 parts DVB, 61.7 parts styrene, 0.036 weight percent TBPO (based on the total weight of monomers employed), 0.025 weight percent TBPB (based on the total weight of monomers employed), 0.3 part CMMC and 0.15 part sodium dichromate. Water is added until the weight phase ratio is 1.0. The reaction mixture is then heated until the temperature is 80° C. and held at 80° C. for 2.5 hours, at which time a monomer feed consisting of 3.5 percent DVB and 96.5 percent styrene is begun. The monomer feed continues for 6 hours until the monomer feed constitutes 71.4 percent of the combined weight of the initial charge, exclusive of water, and the monomer feed. The reaction is maintained at 80° C. for 3 more hours and then finished off at 100° C. for 5.5 hours. The toluene swell crosslink percent is determined according to the procedure of Example 1. A 100-g portion of the beads are converted to strong acid cation exchange resins by sulfonating the beads using a 98–100 weight percent sulfuric acid. The crush strength and percent of original spheres, resistance to osmotic shock and water retention capacity of the sulfonated resins are determined according to the methods desribed in Example 1 with the results as given in Table II. Dry weight capacity is determined by titrating with a standardized sodium hydroxide solution in the presence of sodium chloride.

EXAMPLE 8

The procedure of Example 7 is repeated except that the monomer feed contains no DVB. The resin beads so prepared are sulfonated according to the manner of Example 7 and the properties of the sulfonated resin are as in Table II following.

EXAMPLE 9

The procedure of Example 7 is repeated using 5.9 parts DVB and 59.0 parts styrene in the initial charge. The monomer feed comprising 95 percent styrene and 5 percent DVB is begun 2.5 hours after the reaction mixture reaches 80° C. and is fed over a 6 hour period. After the monomer feed is ended, the reaction is maintained at 80° C. for 3.5 hours and then finished off at 100° C. for 2 hours. The beads thus obtained are sulfonated and the sulfonated beads have the properties as described in Table II following.

EXAMPLE 10

The procedure of Example 9 is repeated using 7.8 parts DVB and 57.1 parts styrene in the initial monomer charge. After the monomer feed is completed, the reaction mixture is held at 80° C. for 4 hours and finished off at 110° C. for 2 hours. The beads thus obtained are sulfonated, and the sulfonated beads have the properties as described in Table II following.

EXAMPLE 11

Into a 20-gallon, glass-lined reactor equipped with an agitator are loaded 35 parts by weight of 0.3 percent crosslinked styrene DVB copolymer seed particles having a particle size of about 280–300 $\mu$m. To the seed particles are added, with agitation, 65 parts water, 4.2 parts DVB, 60.7 parts styrene, 0.036 weight percent TBPO (based on the total weight of monomers employed), 0.025 weight percent TBPB (based on the total weight of monomers employed), 0.4 part stabilizer and 0.3 part sodium dichromate. Water is added until the weight phase ratio, after the addition of the monomer feed, will be 1.0. The reaction mixture is then heated until the temperature is 78° C. and held at 78° C. for 2.75 hours, at which time a monomer feed consisting of 2.5 percent DVB and 97.5 percent styrene is begun. The monomer feed continues for 6 hours until the monomer feed constitutes 71.4 weight percent of the copolymer bead. The reaction is maintained at 78° C. for 3.25 hours and then finished off at 110° C. for 2 hours. The beads so obtained are sulfonated using 93 weight percent sulfuric acid. The sulfonated beads have properties as described in Table II following.

In order to further illustrate the resistance of these cation exchange resin beads to osmotic shock, a portion of the beads are immersed in a 93 percent sulfuric acid solution, removed and instantaneously washed with copious amounts of deionized water while draining the sulfuric acid. In this test, the resin beads are very rapidly hydrated. This test is generally even more severe than the cycling between 8M HCl and 8M NaOH described hereinbefore. Fewer than 5 percent of the resin beads of this example are broken when subjected to this test.

EXAMPLE 12

The procedure of Example 11 is repeated using 1.9 parts DVB and 63.0 parts styrene in the initial charge. The monomer feed is 98.5 percent styrene and 1.5 percent DVB. The beads thus obtained are sulfonated as described in Example 8. The properties of the sulfonated beads are described as in Table II following.

The beads of this example are subjected to the instantaneous hydration test described in Example 11, with fewer than 5 percent of the resin beads being broken.

EXAMPLE 13

Into a 3-liter, stainless steel reactor equipped with an agitator are loaded 35 parts by weight of 0.3 percent crosslinked styrene DVB copolymer seed particles having a particle size in the range from 180–300 $\mu$m. To the seed particles are added, with agitation, 65 parts water, 6.5 parts DVB, 58.4 parts styrene, 0.036 percent weight (based on total monomers) TBPO, 0.025 weight percent (based on total monomers) TBPB, 0.4 part stabilizer and 0.3 part sodium dichromate. Water is added until the weight phase ratio, after the addition of the monomer feed, will be 1.0. The reaction mixture is then heated until the temperature is 78° C. and held at 78° C. for 2.5 hours, at which time a monomer feed consisting of 4.5 percent DVB and 95.5 percent styrene is begun. The monomer feed continues for 6 hours until the monomer feed constitutes 71.4 weight percent of the copolymer bead weight. The reaction is maintained at 78° C. for 4.0 hours and then finished off at 110° C. for 2 hours. The beads so obtained are sulfonated and have the properties described in Table II following.

TABLE I

| Example No. | Ave. DVB %[1] | Toluene Swell[2] Crosslink % | Crush Strength,[3] grams | % Orig.[4] Spheres | Resin Size, μ | % Spheres[5] 10 Cycles Osmotic Shock Test | Dry[6] Weight Capacity (meg/g) | Water[7] Retention Capacity % |
| --- | --- | --- | --- | --- | --- | --- | --- | --- |
| 7 | 3.64 | 8.25 | 4040* | 100 | 800 | 95 | 5.36 | 60.0 |
| 8 | 0.96 | 8.8 | 2600* | 98+ | 900 | 50 | 5.16 | 66.5 |
| 9 | 5.24 | 12.1 | 1710 | 97 | 750 | 97 | 5.25 | 54.5 |
| 10 | 5.83 | 7.75 | 2100* | 98+ | 710–850 | 97 | 5.19 | 53.5 |
| 11 | 3.0 | 11.25 | 1600* | 98 | 800 | 98 | 5.28 | 61.6 |
| 12 | 1.71 | 4.15 | 1640 | 98 | 500–1180 | 98 | 5.35 | 69.8 |
| 13 | 5.37 | N.D. | 3600* | 96 | 500–1180 | 95 | 5.23 | 52.6 |

N.D. Not determined.
[1-7]See Notes [1-7] from Table I.

As can be seen from the data in Table II, the sulfonated resins of this invention exhibit very high crush strength, excellent sphericity and high capacity. The copolymer beads, before the sulfonation thereof, exhibit significantly higher effective crosslink density than actual crosslink density. In addition, the sulfonated resins tested for resistance to osmotic shock exhibit very little breakage upon being subjected to 10 cycles of alternate treatments with 8M HCl and 8M sodium hydroxide.

EXAMPLE 14

Into a 1-gallon, stainless steel reactor equipped with a four-bladed loop agitator are loaded an aqueous phase of 1250 g of water, 2.5 g of carboxymethyl methylcellulose (CMMC), 1.9 g of potassium chromate and the in situ monomer composition of 681.9 g (93 percent) of styrene, 99.4 g (7 percent) of 55 percent divinyl benzene containing 1000 ppm t-butylcatechol (TBC), 0.90 g (0.036 percent based on total monomer) TBPO and 0.313 g (0.025 percent based on total monomer) TBPB. The reactor is then capped and agitation begun at 275 rpm. The system is then flushed with nitrogen and the vent closed. The reaction mixture is held at room temperature for 15 minutes after the agitation is begun. The reaction mixture is then heated up to the polymerization temperature of 80° C. over a period of one hour. The polymerization temperature is maintained for 2.5 hours, after which time the monomer feed stream of 450 g (93 percent) of styrene, 65.7 g (7 percent) of 55 percent DVB containing 333 ppm TBC is added to the reactor at a rate of 4.0 g/min. The reaction mixture is maintained at 80° C. for two hours after the monomer feed is completed. The reaction is finished off by raising the temperature to 110° C. over a one-hour period and holding the reaction at 110° C. for two more hours.

The reactor is then cooled down in one hour and vented prior to unloading the product.

The product beads are then washed free of excess dichromate and CMMC and then dried.

A 100 g portion of the beads are converted to strong acid cation exchange resins by sulfonating the beads using a 99 weight percent sulfuric acid solution in a 6:1 weight ratio of acid to copolymer beads. The beads were pre-screened (−25+50 mesh cut) to remove abnormal beads and fines. The swelling agent used was methylene chloride. The crush strength and percent of original spheres and resistance to osmotic shock of the sulfonated resins are determined according to the methods described in Example 1 with the results as given in Table III. The dry weight capacity is determined by titrating with a standardized sodium hydroxide solution in the presence of sodium chloride. The water retention capacity is determined by placing the resin in a centrifuge to remove excess water and then placing that resin in a moisture balance. The dry weight capacity and water retention capacity are also reported in Table III.

EXAMPLE 15

The procedure of Example 14 is repeated except the in situ monomer composition and the monomer feed composition contain 94.6 g DVB (6 percent) instead of 99.4 (7 percent) and the monomer feed stream contains 93.2 g of 55 percent DVB (6 percent) and 802.95 g styrene (94 percent) instead of 65.7 g of 55 percent DVB (7 percent) and 450 g of styrene (93 percent). The resin beads so prepared are sulfonated according to the method of Example 14 and the properties of the sulfonated resin are reported in Table III.

EXAMPLE 16

The procedure of Example 14 is repeated except the in situ monomer composition and the monomer feed composition contain 107.8 g of 55 percent DVB (8 percent) containing 667 ppm TBC instead of 99.4 g of 55 percent DVB (7 percent) containing 1,000 ppm TBC and the monomer feed stream contains 37.7 g of 55 percent DVB (8 percent) containing 250 ppm TBC and 238.7 g of styrene instead of 65.7 g of 55 percent DVB (7 percent) containing 333 ppm TBC and 450 g of styrene (93 percent). The resin is sulfonated according to the manner of Example 14 and the properties are reported in Table III.

EXAMPLE 17

The procedure of Example 14 is repeated except the in situ monomer composition and the monomer feed composition contain 122.6 g of 55 percent DVB (9 percent) containing 667 ppm TBC instead of 99.4 g of 55 percent DVB (7 percent) containing 1,000 ppm TBC and the monomer feed stream contains 84.1 g of 55 percent DVB (9 percent) containing 222 ppm TBC and 456.9 g of styrene instead of 65.7 g of 55 percent DVB (7 percent) containing 333 ppm TBC and 450 g of styrene (93 percent). The resin is sulfonated according to the manner of Example 14 and the properties are reported in Table III.

TABLE III

| Example No. | Percent DVB | | Crush[3] Strength, grams | Percent[4] Original Spheres | Average Resin Size, μ | Percent[5] Spheres After Osmotic Shock Test | Dry[6] Weight Capacity (meg/g) | Water[7] Retention Capacity Percent |
| --- | --- | --- | --- | --- | --- | --- | --- | --- |
|  | In Situ Monomer | Feed Monomer |  |  |  |  |  |  |
| 14 | 7 | 7 | 1687 | 95 | 785 | ~60 | 5.23 | 44.6 |

TABLE III-continued

| Example No. | Percent DVB In Situ Monomer | Percent DVB Feed Monomer | Crush[3] Strength, grams | Percent[4] Original Spheres | Average Resin Size, μ | Percent[5] Spheres After Osmotic Shock Test | Dry[6] Weight Capacity (meq/g) | Water[7] Retention Capacity Percent |
|---|---|---|---|---|---|---|---|---|
| 15 | 6 | 6 | 1846 | 99 | 838 | ~70 | 5.25 | 45.7 |
| 16 | 8 | 8 | 1216 | 99 | 474 | 95 | 5.20 | 46 |
| 17 | 9 | 9 | 1203 | 99 | 727 | 95 | 5.10 | 40.8 |

[3] See Table I footnotes.
[4] See Table I footnotes.
[5] See Table I footnotes.
[6] See Table I footnotes.
[7] See Table I footnotes.

As can be seen from the data in Table III, the sulfonated resins prepared by the in situ process of the present invention exhibit very high crush strength, excellent sphericity and high capacity. In addition, the sulfonated resins tested for resistance to osmotic shock exhibit very little breakage upon being subjected to 10 cycles of alternate treatments with 8M HCl followed by water and 8M sodium hydroxide followed by water.

What is claimed is:

1. A process for preparing crosslinked copolymer beads comprising:
   (a) forming a suspension of a first monomer mix comprising from about 80 to about 99.95 parts by weight of a monoethylenically unsaturated monomer, about 0.05 to about 20 parts by weight of a polyethylenically unsaturated monomer and a sufficient amount of a substantially water-insoluble free radical initiator to catalyze the polymerization of said first monomer mix and a second monomer mix, then
   (b) polymerizing said first monomer mix until about 10 to about 80 weight percent of said monomers are converted to crosslinked polymer particles, the
   (c) adding to said suspension a second monomer mix, which second monomer mix comprises at least one ethylenically unsaturated monomer but contains essentially no free radical initiator, said addition of said second monomer mix being made under conditions including a temperature sufficient to initiate the free radical polymerization of the monomer in said second monomer mix such that said monomer mix is imbibed by said crosslinked polymer particles and the polymerization of said second monomer mix within said crosslinked polymer particles is catalyzed by the free radical initiator contained in said first monomer mix and wherein the monomers of the second monomer mix, when polymerized, comprise from about 5 to about 90 weight percent of the product copolymer beads.

2. The process of claim 1 wherein the monoethylenically unsaturated monomer is a monovinylidene aromatic or an ester of an α,β-ethylenically unsaturated carboxylic acid.

3. The process of claim 2 wherein the polyethylenically unsaturated monomer is a polyvinylidene aromatic or an alkylene diacrylate or dimethacrylate.

4. The process of claim 3 wherein the monoethylenically unsaturated monomer is styrene, vinyl naphthalene, an alkyl-substituted styrene, or a halo-substituted styrene.

5. The process of claim 4 wherein the polyethylenically unsaturated monomer is divinylbenzene.

6. The process of claim 5 wherein the second monomer mix comprises a second monoethylenically unsaturated monomer and a second polyethylenically unsaturated monomer.

7. The process of claim 6 wherein the monoethylenically unsaturated monomer is a monovinylidene aromatic or an ester of an α,β-ethylenically unsaturated carboxylic acid.

8. The process of claim 7 wherein the second polyethylenically unsaturated monomer is a polyvinylidene aromatic or an alkylene diacrylate or diemthacrylate.

9. The process of claim 8 wherein the second monoethylenically unsaturated monomer is styrene, vinyl naphthalene, an alkyl-substituted styrene, or a halo-substituted styrene.

10. The process of claim 9 wherein the second polyethylenically unsaturated monomer is divinylbenzene.

11. The process of claim 10 wherein the amount of divinylbenzene in the first monomer mix is from about 1 to about 10 parts by weight.

12. The process of claim 11 wherein an effective amount of a polymerization inhibitor is added to the first monomer mix or the second monomer mix so as to control the rate of reaction.

13. The process of claim 12 wherein the monomers of the second monomer mix, when polymerized, comprise from about 25 to about 50 weight percent of the product copolymer beads.

14. The process of claim 1 or 13 further comprising attaching active ion exchange groups to the copolymer beads so as to form an ion exchange resin.

15. The process of claim 14 wherein the copolymer beads are sulfonated so as to prepare a cation exchange resin.

16. A cation exchange resin prepared by the process of claim 15.

* * * * *